US010581686B2

(12) United States Patent
Bryson, Jr.

(10) Patent No.: US 10,581,686 B2
(45) Date of Patent: Mar. 3, 2020

(54) AUTOMATIC CONFIGURATION IN A DISTRIBUTED NETWORK

(71) Applicant: Schweitzer Engineering Laboratories, Inc., Pullman, WA (US)

(72) Inventor: Richard P. Bryson, Jr., Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 401 days.

(21) Appl. No.: 15/447,710

(22) Filed: Mar. 2, 2017

(65) Prior Publication Data

US 2018/0254953 A1 Sep. 6, 2018

(51) Int. Cl.
| | |
|---|---|
| G06F 15/16 | (2006.01) |
| H04L 12/24 | (2006.01) |
| G06F 16/951 | (2019.01) |
| G06F 16/23 | (2019.01) |
| H04L 29/06 | (2006.01) |
| H04L 29/08 | (2006.01) |
| H02J 13/00 | (2006.01) |
| H02J 3/00 | (2006.01) |

(52) U.S. Cl.
CPC ...... *H04L 41/0886* (2013.01); *G06F 16/2379* (2019.01); *G06F 16/951* (2019.01); *H02J 13/0075* (2013.01); *H04L 41/0806* (2013.01); *H04L 41/0816* (2013.01); *H04L 41/0853* (2013.01); *H04L 67/12* (2013.01); *H04L 69/18* (2013.01); *H02J 3/00* (2013.01)

(58) Field of Classification Search
USPC ....................................................... 709/217
See application file for complete search history.

(56) References Cited

U.S. PATENT DOCUMENTS

| | | | | |
|---|---|---|---|---|
| 7,859,403 | B2* | 12/2010 | Tampke | H04M 11/002 |
| | | | | 340/506 |
| 8,756,411 | B2* | 6/2014 | Wei | H04L 63/0281 |
| | | | | 713/151 |
| 9,401,839 | B2* | 7/2016 | Kidwell | H04L 41/0226 |
| 9,705,305 | B2* | 7/2017 | Dolezilek | H02J 13/0013 |
| 9,886,207 | B2* | 2/2018 | Hsiao | G06F 3/0625 |
| 10,079,486 | B2* | 9/2018 | Hong | H02H 7/263 |

(Continued)

OTHER PUBLICATIONS

SEL-421 Relay Protection and Automation System Instruction Manual, 2011, pp. 1-1298. (Year: 2011).*
PAP12 IEC 61850 Objects/DNP3 Mapping (6.2.2) Jul. 30, 2009.

*Primary Examiner* — Alicia Baturay
(74) *Attorney, Agent, or Firm* — Jared L. Cherry

(57) ABSTRACT

The present disclosure pertains to configuration of devices using distributed network protocols. In one embodiment, a client may poll a server device and receive a first set of data using a first communication protocol. The client may analyze the first set of data to determine a number and a type of each of a plurality of data points comprised in the first set of data. The client device may issue a query to the server device and may receive a second set of data using a second communication protocol. The second set of data may comprise information associated with each of the plurality of data points comprised in the first set of data. A data map may be created based on the first set of data and second set of data, and the client may be at least partially configured automatically based on the data map.

13 Claims, 5 Drawing Sheets

(56) References Cited

U.S. PATENT DOCUMENTS

| | | | |
|---|---|---|---|
| 10,102,669 B2* | 10/2018 | Watts | G06F 16/50 |
| 10,171,252 B2* | 1/2019 | Yamaguchi | G06F 21/55 |
| 10,185,831 B2* | 1/2019 | Shon | G06F 21/577 |
| 2015/0035681 A1* | 2/2015 | Bryson, Jr. | G01D 21/00 |
| | | | 340/870.02 |
| 2017/0149734 A1* | 5/2017 | Wallace | H04L 63/205 |
| 2019/0006837 A1* | 1/2019 | Hong | H02H 7/263 |
| 2019/0089722 A1* | 3/2019 | Ciocarlie | H04L 67/22 |
| 2019/0273653 A1* | 9/2019 | Gammel | H04L 43/14 |
| 2019/0273686 A1* | 9/2019 | Gammel | H04L 67/30 |
| 2019/0273691 A1* | 9/2019 | Gammel | H04L 43/04 |

* cited by examiner

Figure 2

| Exemplary Representation of Response to Static Poll ||||| 
|---|---|---|---|---|
| Object | Variation | Index | Type | Present Value |
| 1 | | | | |
| | .1 | .1 | Binary input | *** |
| | .1 | .2 | Binary input | *** |
| 10 | | | | |
| | .1 | .1 | Binary output | *** |
| | .1 | .2 | Binary output | *** |
| 30 | | | | |
| | .1 | 1 | 32-Bit Analog Input | *** |

Figure 3

| Exemplary Representation of Data Map in Client Device ||||| 
|---|---|---|---|---|
| Object | Variation | Index | Type | Tag / Description |
| 1 | | | | |
| | .1 | .1 | Binary input | Enabled |
| | .1 | .2 | Binary input | DoorOpen |
| 10 | | | | |
| | .1 | .1 | Binary output | Online |
| | .2 | .2 | Binary output | Alarm |
| 30 | | | | |
| | .1 | 1 | 32-Bit Analog Input | Voltage |

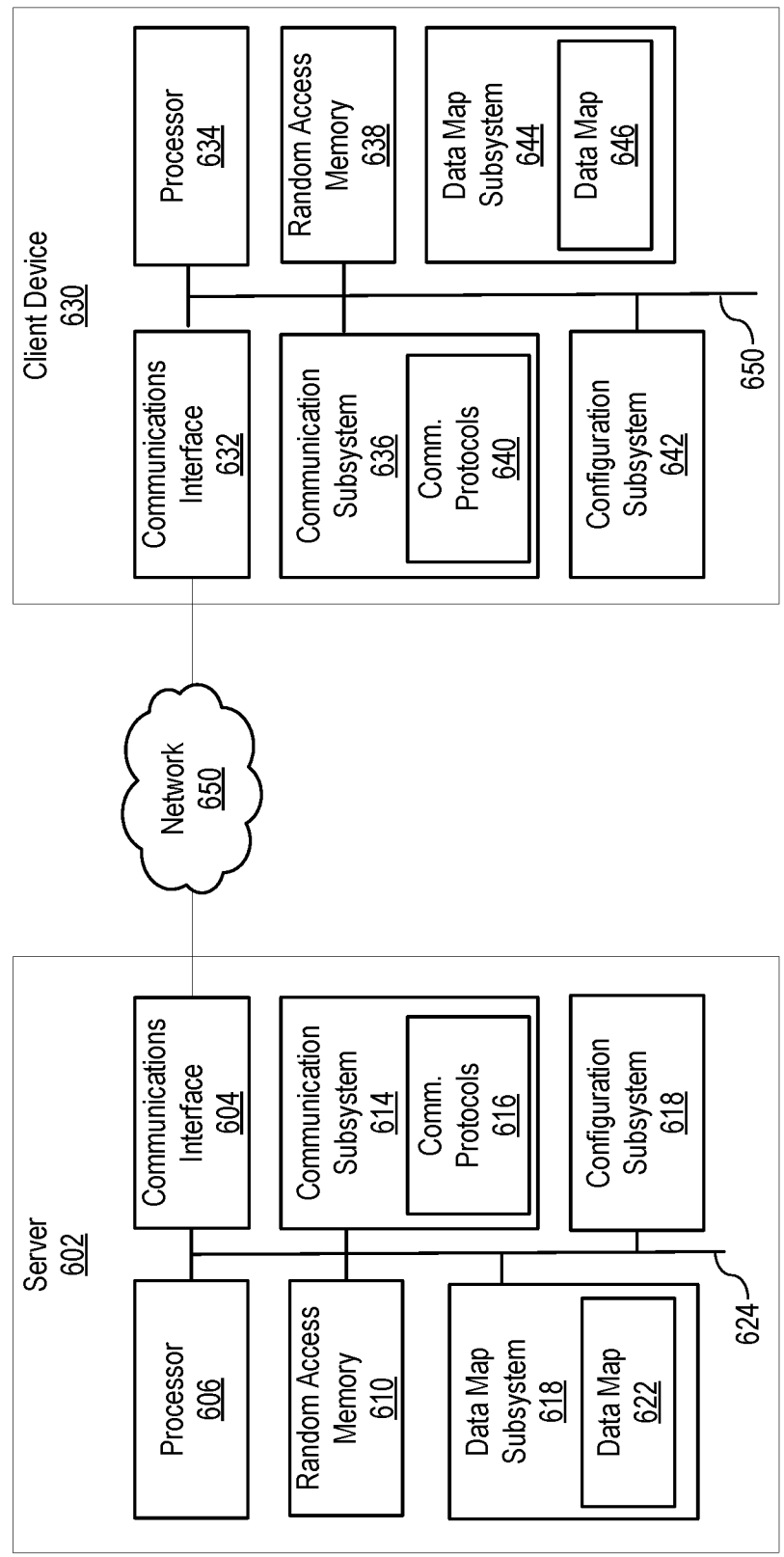

AUTOMATIC CONFIGURATION IN A DISTRIBUTED NETWORK

TECHNICAL FIELD

The present disclosure pertains to systems and methods for configuration of devices using distributed network protocols. More particularly, but not exclusively, the present disclosure pertains to automatic configuration of client devices and servers within an electric power system using the DNP3 protocol.

BRIEF DESCRIPTION OF THE DRAWINGS

Non-limiting and non-exhaustive embodiments of the disclosure are described, including various embodiments of the disclosure, with reference to the figures, in which:

FIG. 2 provides an exemplary representation of the various types of data that may be provided in response to a static data poll from a client device consistent with the present disclosure.

FIG. 3 provides an exemplary representation of a data map including tags or descriptions associated with a plurality of data points consistent with the present disclosure.

FIG. 6 illustrates a functional block diagram of a system configured to exchange information between a client device and a server relating to data point tags or descriptions and configured to utilize the information to at least partially configure the server or the client device consistent with embodiments of the present disclosure.

DETAILED DESCRIPTION

Figure 1:
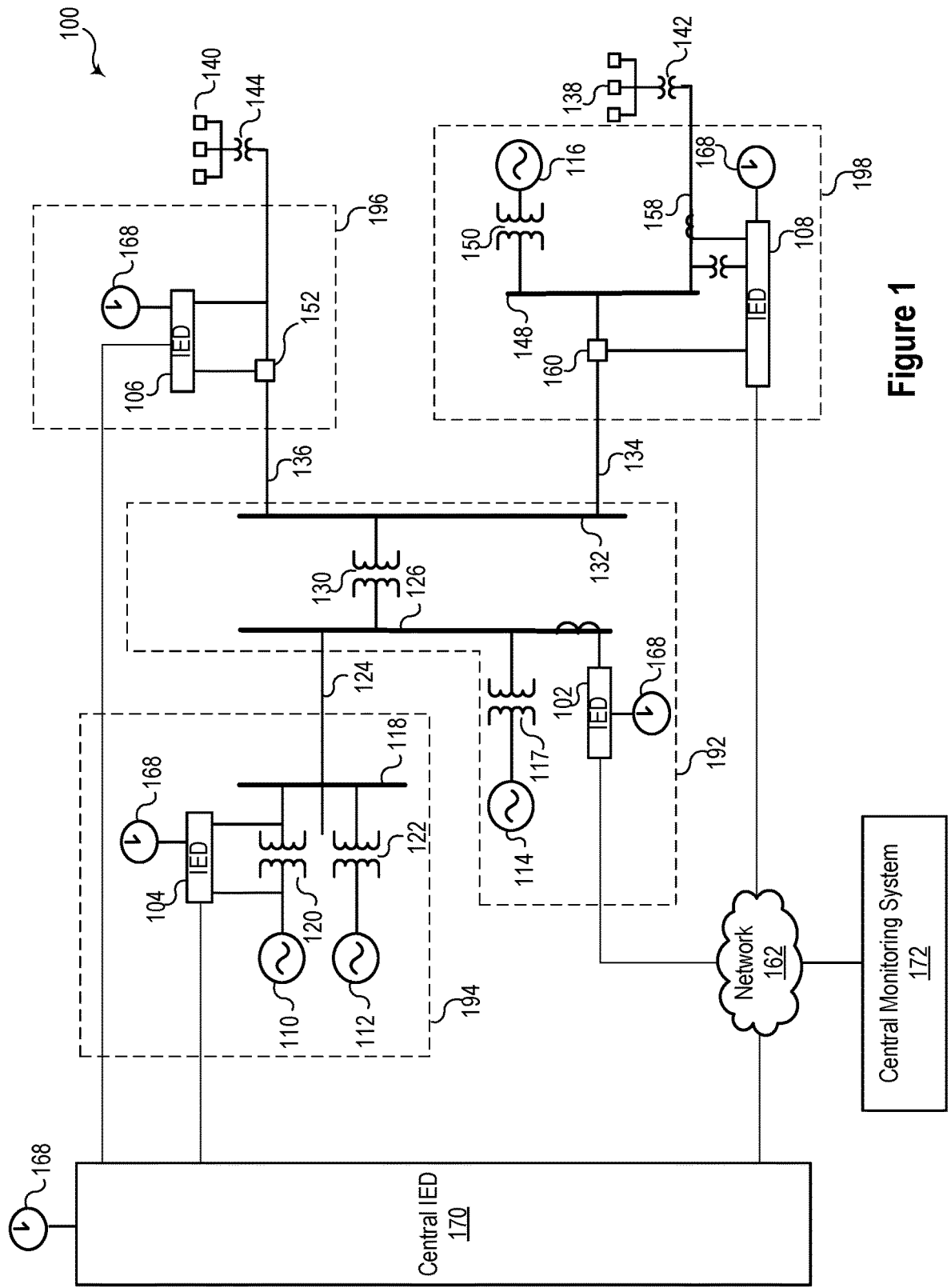
FIG. 1 illustrates an embodiment of a simplified one-line diagram of an electric power transmission and distribution system in which a plurality of communication devices may facilitate communication in a software defined network consistent with embodiments of the present disclosure.

Systems and methods consistent with the present disclosure may help to reduce the complexity of certain aspects of commissioning and/or maintaining a communication network by automating certain aspects of the configuration of certain devices. In various embodiments, the DNP3 protocol may be used to determine the number and type of data points of a plurality of client devices. A data point may refer to a specific data value or condition that may be monitored and communicated. For example, a data point may comprise a representation of a time-varying voltage, an electrical current measurement, or a representation of the state of a device.

Automatic determination of the number and type of data points may be useful for mapping data points within a server during commissioning and operation of the system. More specifically, automatic determination of the number and type of data points of a plurality of client devices may be useful to detect and respond to changes within the system. For example, if a DNP3 map in a server device is changed after configuration of the substation client, the client may continue to associate mapped data points with the previously specified tags or descriptions even though the numbered points may refer to different data points within the server. Systems and methods consistent with the present disclosure may help to reduce or eliminate such issues and may further provide other benefits recognized by one of skill in the art. For example, systems and methods consistent with the present disclosure may aid in troubleshooting SCADA point mismatches during commissioning.

A tag or description may be a data point that originates in a server device. For example, a tag or description may represent a breaker status, voltage, current, or the like. DNP3 and many other protocols reference these values by a position in a point map. In one specific embodiment, a breaker status may be point 0 in a map of binary inputs, a Phase A voltage may be point 0 in an analog input point map, and a Phase A current may be as point 1, etc. A client device may utilize point maps for binary inputs, analog inputs and other point types, but those maps are positional point lists with no definition of what each point means. Point 0 in the server's binary input map will be populated by point 0 from the client's point map, but the operator must associate the point map with the appropriate values. Due to the number of data points and complexity of many systems, it is common for the point values in the client point list to be populated with unexpected values. Operator error is the primary reason for incorrect configuration of the point map. Auto-populating the maps with the points list and the point names may help to reduce or eliminate such errors.

Although various embodiments disclosed herein specifically relate to the DNP3 protocol, the teachings of the present disclosure may be applied to other communication protocol. The DNP3 protocol, and other communications protocols may permit an initial query of data points. Such information may be used in connection with the techniques disclosed herein to at least partially configure a receiving device.

Systems and methods consistent with the present disclosure may be utilized in a variety of applications and technologies and in connection with various communication protocols. Various embodiments consistent with the present disclosure are discussed in connection with electric power distribution and transmission systems; however, the present disclosure is not limited to electric power systems. Further, various embodiments consistent with the present disclosure are discussed in connection with the DNP3 protocol; however, the present disclosure is also not limited to the DNP3 protocol. Rather, the specific embodiments discussed herein provided non-exhaustive examples of applications, technologies, and protocols consistent with the teaching presented herein.

Modern electric power distribution and transmission systems may incorporate a variety of communication technologies that may be used to monitor and protect the system. The communication equipment may be configured and utilized to facilitate an exchange of data among a variety of devices that monitor conditions on the power system and implement control actions to maintain the stability of the power system. The communication networks carry information necessary for the proper assessment of power system conditions and for implementing control actions based on such conditions. Implementing communication among various types of communication equipment within an electric power distribution system may involve significant complexity, and such complexity may result in additional burdens and costs associated with operation.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates an embodiment of a simplified one-line diagram of an electric power transmission and distribution system 100 in which a plurality of communication devices may facilitate communication in a software defined network consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160), busses (e.g., busses 118, 126, 132, and 148), loads (e.g., loads 140, and 138) and the like. A variety of other types of equipment may also be included in electric power delivery system 100, such as voltage regulators, capacitor banks, etc.

Substation 192 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 196 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 198, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 102, 104, 106, 108, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 102, 104, 106, 108, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 102, 104, 106, 108, and 170 may receive a common time signal 168. The time signal may be distributed in system 100 using a communication network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 102, 104, 106, and 108. IEDs 102, 104, 106, and 108 may be remote from the central IED 170, and may communicate over various media such as a direct communication from IED 106 or over a wide-area communication network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multifunction hardware (e.g., processors, computer-readable storage media, communication interfaces, etc.) that can be utilized in order to perform a variety of tasks that pertain to network communications and/or to operation of equipment within system 100.

In various embodiments, IED 102, 104, 106, and 108 may also be configured to act as servers or data concentrators for other devices (not shown) within substations 192, 194, 196, and 198, respectively. During commissioning and/or during operation, such other devices may be monitored using the techniques described herein to at least partially automate the configuration of the devices. In some embodiments, the DNP3 protocol may be used to communicate data within the substation and to communicate such data to other systems, such as central monitoring system 172.

FIG. 2 provides an exemplary representation of the various types of data that may be provided in response to a static data poll from a client device consistent with the present disclosure. The DNP3 protocol provides for polling of both "static" data and "event" data. Event data is generated as a result of changes in data, where static data remains constant. In connection with a static data poll from a client, the server may provide information about the number and types of inputs in its database. In the illustrated representation of the data, two binary inputs, two primary outputs, and an analog input are provided. Each data point is associated with a specific object, variation, and index, as shown in the representation in FIG. 2. As may be appreciated, the information provided in response to a static data poll may provide an indication of the number and type of a plurality of data points.

A static poll may also provide the present value of the data point at the time of the static poll. In certain embodiments consistent with the present disclosure, the present value of the data point may be discarded because the information relating to configuration may be determined based on the number and type of data points. In other embodiments, the present values for the data points may be utilized by the polling device.

Additional types of information associated with various data points may also be stored by the server, such as a tag or description; however, this information is not provided in response to a static data poll. The tag or description may commonly require manual entry in both the server device and the client. The manual entry of such information can create additional effort associated with commissioning a system and may introduce errors into the configuration.

Further, changes or updates made in one device may not be propagated to other devices. In some organizations different groups or departments may have differing responsibilities that may impede the coordination of changes made to the server device and the client. For example, in many devices configured to communicate using the DNP3 protocol, the device may be configured with an arbitrary data map. In some organizations functions relating to protection may be performed by one group while functions relating to automation may be performed by another group. Configuration of the server device may be commonly deemed a function associated with protection, while configuration of the client may be commonly deemed a function associated with automation. Such a division of labor, while useful for a variety of reasons, may further complicate the task of uniformly implementing changes to the data map. Misalignment of the data maps between a server device and a client may result in inaccurate utilization or interpretation of information from the updated device. Such issues may adversely impact the operation of the system.

The tags or description may be utilized in connection with configuration of various settings associated with the device. For example, the tags/descriptions may be used to identify specified conditions and/or to trigger certain actions. For example, a data tag associated with a particular data point received from a server device may identify a voltage in an electrical power system to be monitored for an under-voltage condition. An update to the server device may cause the voltage value to now correspond to another data point; however, such a change may not be consistently implemented on the client. Using the systems and methods disclosed herein, information relating to the update may be determined and appropriate adjustments may be made automatically in the configuration of the client to accommodate the updates made to the server device.

FIG. 3 provides an exemplary representation of a data map including tags or descriptions associated with a plurality of data points consistent with the present disclosure. In various embodiments, a server device may include a tag or a description associated with the data points; however, the DNP3 protocol does not provide a mechanism for transmission of this information. As such, during commissioning the tag or description, as shown in the left column in FIG. 4, may need to be entered in both the server devices and the client. Further, if the description is changed, the change may need to be implemented manually in other devices, such as the DNP3 client.

In some embodiments, the client may query the device using another protocol. In one specific embodiment, the client may query the device using SEL ASCII Commands, which is available in products from Schweitzer Engineering Laboratories of Pullman Wash. A client in communication with an SEL device with the intent of communicating via the DNP3 protocol may issue ASCII commands to the server device. The ASCII commands may be used to retrieve the DNP3 map from the relay. In response to the ASCII commands, the server may provide a list, in order, of all ASCII data point names that are mapped to the DNP3 server to the polling client. The client device may use the ASCII point names to update each newly configured tag in such a way that the tags or descriptions match the point names used in the server. In other embodiments any protocol that permits the client to query the server and that permits the server to transmit the data tags or descriptions may be utilized.

In various embodiments consistent with the present disclosure, information utilized to automate configuration of a client and server device may be obtained in two steps. In the first step, a Class 0 may be used to obtain static data of every point configured in the DNP3 client of that device. In response to the Class 0 poll, a DNP3 client may respond to the Class 0 poll by identifying a number of analog inputs, digital inputs, counter inputs, binary outputs, analog outputs, etc. Such information may be similar to the information illustrated in FIG. 2. In the second step, a second protocol may be used to query the server device to obtain a list of tags or descriptions associated with the various data points identified using the Class 0 poll.

Figure 4:
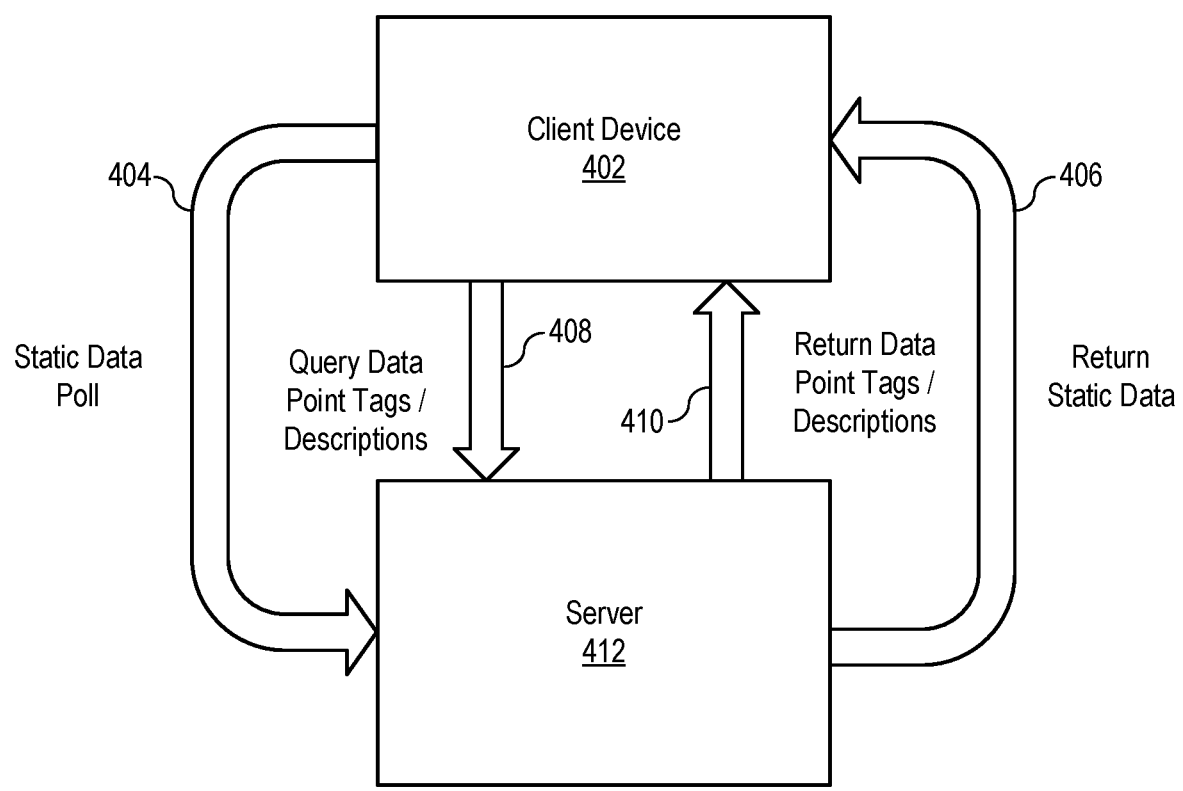
FIG. 4 illustrates a conceptual representation of an interaction between a client device and a server that may be used to obtain information to at least partially configure the client device consistent with embodiments of the present disclosure.

FIG. 4 illustrates a conceptual representation of an interaction between a client device 402 and a server 412 that may be used to obtain information to at least partially configure the client device 402 consistent with embodiments of the present disclosure. In connection with FIG. 4, the client device 402 and the server 412 may be configured to communicate using the DNP3 communication protocol. A static poll, as indicated by arrow 404, may be issued by the client to the server 412. Various types of information may be provided in response to the Class 0 poll, as indicted by arrow 406. Using the information provided in response to the Class 0 poll, the client device may identify the DNP map and may determine the number and type of data points.

The client device 402 may issue another query, as indicated by arrow 408, to the server to obtain the data point tags or descriptions. In some embodiments, the query 408 may comprise an SEL ASCII query. In response to the query, a plurality of data point tags or descriptions may be returned, as indicated by arrow 410. The data point tags may be used by the client device 402 to update the data map with the data point tags or descriptions.

In various embodiments, the client device 402 and the server 412 may be in communication via a single physical connection capable of carrying communications in multiple protocols. In some embodiments, the physical connection may comprise an Ethernet connection, and DNP3 communications and SEL ASCII commands may be transferred over the Ethernet connection.

Figure 5:
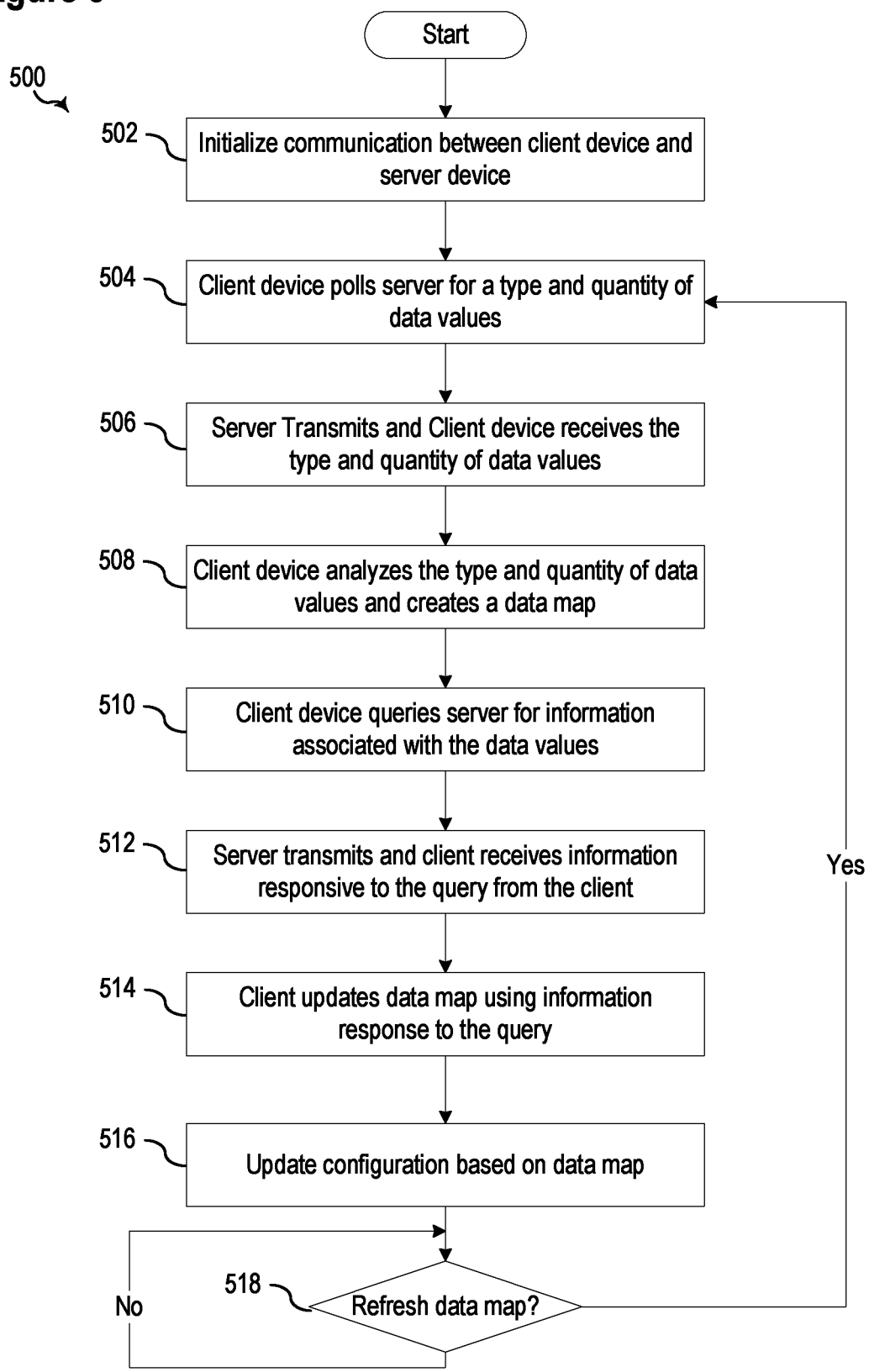
FIG. 5 illustrates a flow chart of a method for exchanging information between a client device and a server relating to data point tags or descriptions and utilizing the information to at least partially configure communication between the server and client device consistent with embodiments of the present disclosure.

FIG. 5 illustrates a flow chart of a method 500 for exchanging information between a client device and a server relating to data point tags or descriptions and utilizing the information to at least partially configure communication between the server and client device consistent with embodiments of the present disclosure. At 502, communications between a server device and a client may be initialized. Initializing communications may, among other things, comprise physically connecting the devices or connecting the devices to the same data communication network.

At 504, the client device may poll the server for a type and quantity of data values within a data map of the server. The poll of the data may be communicated using a first data protocol. In various embodiments, the server device and client may be configured to communicate using the DNP3 protocol. In such embodiments, the static data poll may comprise a Class 0 poll. In response to the Class 0 poll, the server may provide information about the current state of a number of analog inputs, digital inputs, counter inputs, binary outputs, analog outputs, etc. In other embodiments, alternative communication protocols may be used, and an appropriate query may be made based on the specific communication protocol being used. At 506, the server may transmit and the client device may receive the type and quantity of data values.

At 508, the client may analyze the type and quantity of data values and may create a data map based on the type and quantity of data values. In various embodiments, only certain portions of the data received at 506 may be utilized to create the data map. For example, in an embodiment utilizing the DNP3 protocol, the data values may be discarded because the information relating to the data map may be determined based on the number and type of data points. Other types of analysis may be performed to adapt the teachings of the present disclosure for use with other communication protocols.

At 510, the client may query the server device for information associated with but not included in the data values received at 506. In some embodiments, the query may be performed using a second communication protocol. In some embodiments, the second protocol may be utilized because the communication protocol utilized for the poll at 504 does not support the transfer of the data requested at 510. In some embodiments, the query may be performed using the SEL ASCII protocol. The queried information may include a plurality of tags or descriptions associated with the data values. At 512, the server may transmit and the client may receive information responsive to the query.

At 514, the client may update the data map using the information received at 512. In various embodiments, the data map may be updated to include descriptions corresponding to each of the data points associated with the server device. In other embodiments, other types of information may be provided and utilized in updating the data map. For example, analog scaling values may also be provided, and such values may be applied to the client's analog point map.

At 516, a configuration of one of the client device may be updated based on the data map. In various embodiments, the information received in response to the query may be used to identify specified conditions and/or to trigger certain actions. Various configuration updates may be made in response to the information in the data map.

At 518, method 500 may determine whether the data should be refreshed. In some embodiments, the data map may be refreshed according to a schedule. Periodically refreshing the data may help to identify changes made to either the server or the client and to maintain consistency in the data maps utilized by the devices. In other embodiments, the data map may be refreshed in response to certain conditions, such as initial startup of the client.

FIG. 6 illustrates a functional block diagram of a system configured to exchange information between a client 630 and a server device 602 relating to data point tags or descriptions and configured to utilize the information to at least partially configure the client device 630 consistent with embodiments of the present disclosure. In some embodiments, the server device 602 and the client 630 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

Server device 602 and client 630 each include a communications interface 604 and 632, respectively. Communications interfaces 604 and 632 may each be in communication with a network 650. Data busses 624 and 650 may facilitate communication among various components of the server device 602 and the client 630, respectively. Processors 606 and 634 may be configured to process communications and to coordinate the operation of the other components of server 602 and the client device 630, respectively. Processors 606 and 632 may operate using any number of processing rates and architectures. Processors 606 and 632 may be configured to perform any of the various algorithms and calculations described herein. Processors 606 and 632 may be embodied as a general purpose integrated circuit, an application specific integrated circuit, a field-programmable gate array, and/or any other suitable programmable logic device. Instructions to be executed by processors 606 and 634 may be stored in random access memory 610 (RAM) and 638, respectively.

Communications subsystems 614 and 636 may be configured to facilitate communications between server device 602, client 630, and other devices (not shown) connected to network 650. The communication subsystems 614 and 636 may utilize various communication protocols 616 and 640, respectively. In some embodiments, multiple communication protocols may be utilized to obtain different types of information. In one specific embodiment, the communication protocols utilized by communication subsystems 614 and 636 include DNP3 and SEL ASCII Protocol. In various embodiments, communication subsystem 614 and 636 may further be configured to issue polls or queries to ascertain information from other devices connected to network 650.

Data map subsystems 618 and 644 may be configured to create and maintain data maps associated with a variety of data points. In various embodiments, specific types of data may be associated with specific data points communicated from client 630 to server device 602. FIGS. 2 and 3 provide exemplary representations of the types of data that may be included in a data map. The data maps 622 and 646 may be created and/or updated by data map subsystems 618 and 644, respectively. In various embodiments, the data maps 622 and 646 may also be updated or edited using information from various sources, including information provided by a user. A discussed herein, various embodiments consistent with the present disclosure may be used to propagate updates or changes to a data map by a user to other devices.

Configuration subsystems 618 and 642 may be configured to configure server device 602 and client 630, respectively, to communicate via network 650 and/or to identify specified conditions. The configuration of server device 602 and client 630 may be based, at least in part on the data maps 622 and 646, respectively. In various embodiments, the configuration subsystems 618 and 642 may also permit configuration of the server device 602 and the client 630 using information in addition to the data maps. For example, a user may be able to provide confirmation information to configuration subsystem 618 or configuration subsystem 642.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A client in an electrical power system configured to exchange information with a server device and configured to use the information to at least partially configure the client device, comprising:
   a communication interface configured to communicate with the server device;
   a communication subsystem configured to communicate with the server device through the communication interface and configured:
      to transmit from the client device a static data poll request using a distributed network protocol (DNP3) and to receive from the server device a first set of data in response to the static data poll request using DNP3;
      to transmit from the client device a first query to the server device using a second communication protocol and to receive a second set of data from the server device using the second communication protocol;
   a data map subsystem configured:
      to create a data map based on the first set of data, the first set of data comprising a representation of a number and a type of each of a plurality of data points in the data map, at least one of the plurality of data points corresponding to a measurement of a condition in the electrical power system; and
      to populate the data map based on the second set of data, the second set of data comprising a point name associated with each of the plurality of data points comprised in the first set of data; and
   a configuration subsystem configured to associate the plurality of point names with the plurality of data points in the data map and thereby at least partially configure the client based on the data map.

2. The client of claim 1, wherein the second communication protocol comprises an SEL ASCII protocol.

3. The client of claim 1, wherein the communication interface comprises a physical communication configured to permit communication using the first communication protocol and the second communication protocol.

4. The client device of claim 1, wherein the communication subsystem is further configured to issue a second query to the server using the second communication protocol; and
   the data map subsystem is further configured:
      to identify a change in information associated with each of the plurality of data points comprised in the first set of data; and
      to update the data map based on the change.

5. A client device configured to exchange information with a server and to use the information exchanged with the server to at least partially configure the client device, comprising:
   a communication interface configured to communicate with the server;
   a communication subsystem configured to communicate with the server through the communication interface and configured:
      to issue a first static data poll request to the server using a distributed network protocol (DNP3) and to receive from the server a first set of data in response to the first static data poll request using DNP3;

to issue to the server a first query using a second communication protocol and to receive from the server a second set of data using the second communication protocol;

a data map subsystem configured:

to create a data map based on the first set of data, the first set of data comprising a representation of a number and a type of each of a plurality of data points in the data map, and to populate the data map based on the second set of data, the second set of data comprising a point name associated with each of the plurality of data points comprised in the first set of data;

a configuration subsystem configured to associate the plurality of point names with the plurality of data points in the data map and thereby at least partially configure the client device based on the data map;

wherein the data map subsystem is further configured:

to compare the first set of data received in response to the first static data poll to a subsequent set of data received in response to a subsequent static data poll;

to identify a change in information between the first set of data and the subsequent set of data;

to update the data map based on the change; and to at least partially reconfigure the client device based on the change.

6. The client device of claim 5, wherein the second set of data comprises a plurality of descriptions corresponding to each of the plurality of data points comprised in the first set of data.

7. The client device of claim 5, wherein the data map subsystem is further configured to discard from the static data poll a present value associated with each of the plurality of data points.

8. The client device of claim 5, wherein the second communication protocol comprises a SEL ASCII protocol.

9. A method for exchanging information between a client device in an electrical power system and a server and at least partially configuring one of the client device and the server based on the exchanged information, the method comprising:

transmitting a static data poll to the server using a distributed network protocol (DNP3) using the client device;

receiving from the server a first set of data using DNP3;

analyzing the first set of data to determine a number and a type of each of a plurality of data points comprised in the first set of data;

issuing a first query to the server, from the client device, to receive a second set of data using a second communication protocol, the second set of data comprising a point name associated with each of the plurality of data points comprised in the first set of data;

creating a data map in the client device based on the first set of data, the first set of data comprising a representation of a number and a type of each of a plurality of data points in the data map, at least one of the plurality of data points corresponding to a measurement of a condition in the electrical power system;

populating the data map based on the second set of data, the second set of data comprising a point name associated with each of the plurality of data points comprised in the first set of data; and associating the plurality of point names with the plurality of data points in the data map and thereby at least partially configuring the client device based on the data map.

10. The method of claim 9, wherein the second set of data further comprises a plurality of descriptions corresponding to each of the plurality of data points comprised in the first set of data.

11. The method of claim 9, further comprising discarding from the static data poll a present value associated with each of the plurality of data points.

12. The method of claim 9, wherein the second communication protocol comprises an SEL ASCII protocol.

13. The method of claim 9, further comprising:

issuing a second query to the server to refresh information associated with each of the plurality of data points comprised in the first set of data;

analyzing a response to the second query to identify a change in information associated with each of the plurality of data points comprised in the first set of data;

updating the data map in the client device based on the change.

* * * * *